United States Patent
Shibata

(10) Patent No.: US 9,907,016 B2
(45) Date of Patent: Feb. 27, 2018

(54) COMMUNICATION DEVICE

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 275 days.

(21) Appl. No.: 14/300,772

(22) Filed: Jun. 10, 2014

(65) Prior Publication Data

US 2014/0362841 A1  Dec. 11, 2014

(30) Foreign Application Priority Data

Jun. 11, 2013 (JP) ................. 2013-122864

(51) Int. Cl.
*H04W 76/02* (2009.01)
*H04W 48/16* (2009.01)
*H04W 48/18* (2009.01)
*H04W 84/12* (2009.01)

(52) U.S. Cl.
CPC ............ *H04W 48/18* (2013.01); *H04W 84/12* (2013.01)

(58) Field of Classification Search
CPC .............................. H04W 48/18; H04W 84/12
See application file for complete search history.

(56) References Cited

U.S. PATENT DOCUMENTS

| | | |
|---|---|---|
| 7,769,837 B2 | 8/2010 | Nogawa |
| 8,457,085 B2 | 6/2013 | Izaki |
| 2005/0083894 A1* | 4/2005 | Tagawa ................. H04L 67/322 370/338 |
| 2005/0148326 A1 | 7/2005 | Nogawa et al. |
| 2009/0046686 A1 | 2/2009 | Izaki |

(Continued)

FOREIGN PATENT DOCUMENTS

| | | |
|---|---|---|
| JP | 2005-174134 A | 6/2005 |
| JP | 2007-295084 A | 11/2007 |

(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Awet Haile
(74) *Attorney, Agent, or Firm* — Banner & Witcoff, Ltd.

(57) ABSTRACT

A communication device may perform judging whether a specific wireless setting value for establishing the wireless connection with a specific access point is to be received from the specific access point or from a terminal device different from the specific access point. The communication device may receive the specific wireless setting value from the specific access point in a case where it is judged that the specific wireless setting value is to be received from the specific access point. The communication device may receive the specific wireless setting value from the terminal device in a case where it is judged that the specific wireless setting value is to be received from the terminal device. The communication device may establish the wireless connection with the specific access point by using the specific wireless setting value.

10 Claims, 9 Drawing Sheets

(56) References Cited

U.S. PATENT DOCUMENTS

| | | | |
|---|---|---|---|
| 2011/0069832 A1* | 3/2011 | Tang | H04L 63/1441 |
| | | | 380/1 |
| 2012/0106396 A1 | 5/2012 | Sakai | |
| 2013/0148149 A1* | 6/2013 | Park | G06F 3/1296 |
| | | | 358/1.13 |
| 2013/0223279 A1* | 8/2013 | Tinnakornsrisuphap | |
| | | | H04L 41/0809 |
| | | | 370/254 |
| 2013/0250358 A1* | 9/2013 | Suzuki | H04L 65/1069 |
| | | | 358/1.15 |
| 2013/0260683 A1 | 10/2013 | Suzuki et al. | |
| 2014/0071807 A1* | 3/2014 | Tohzaka | H04W 24/04 |
| | | | 370/216 |
| 2014/0362841 A1 | 12/2014 | Shibata | |

FOREIGN PATENT DOCUMENTS

| | | |
|---|---|---|
| JP | 2009-044701 A | 2/2009 |
| JP | 2011-015285 A | 1/2011 |
| JP | 2012-100171 A | 5/2012 |
| JP | 2014-241487 A | 12/2014 |

OTHER PUBLICATIONS

Mar. 10, 2017—(US) Co-pending U.S. Appl. No. 15/455,782.
Feb. 14, 2017—(JP) Notification of Reason for Rejection—App 2013-122864, Eng Tran.

* cited by examiner (Third Embodiment)
(Case A3)

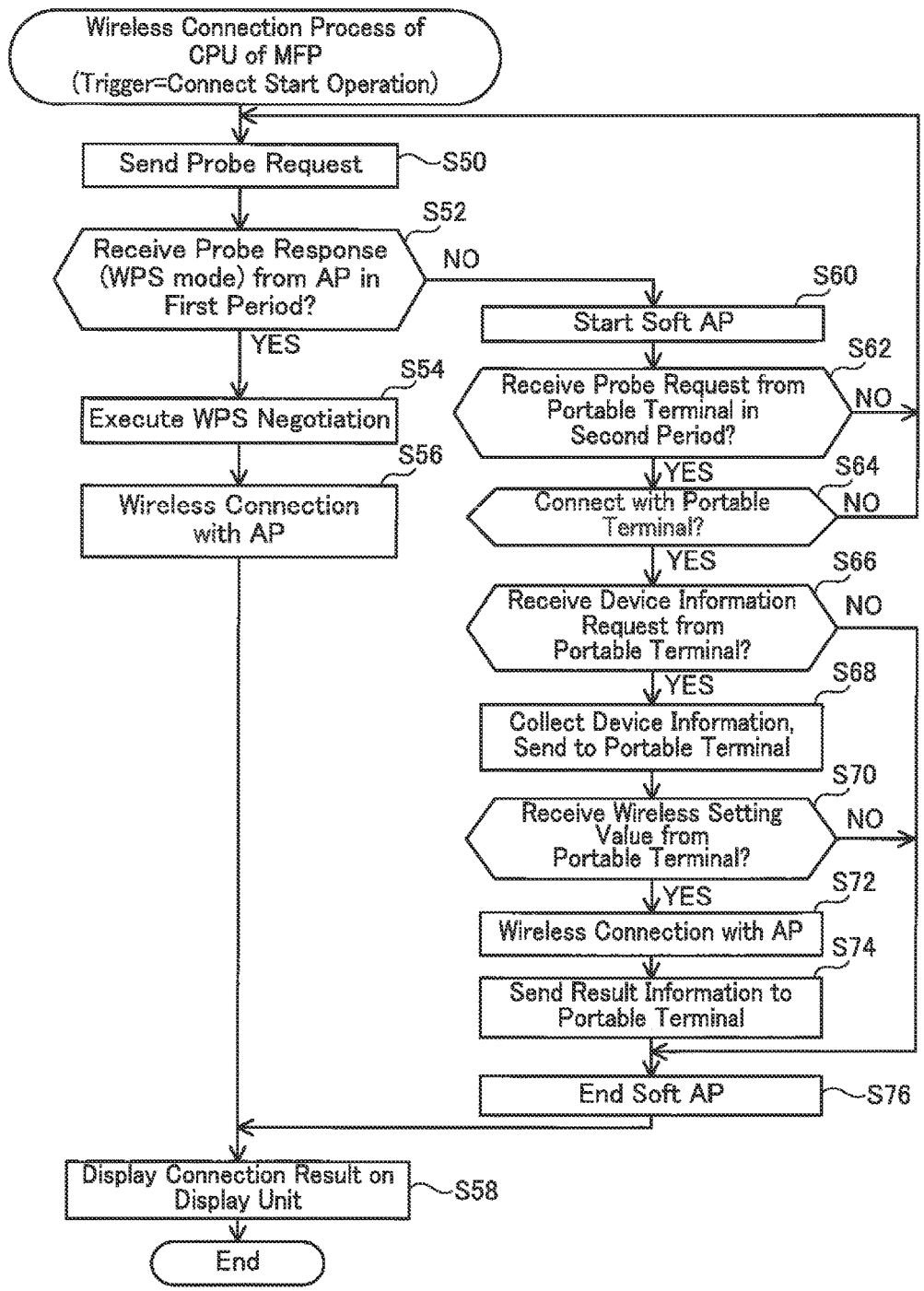
FIG. 9 (Fourth Embodiment)

FIG. 10

(Fourth Embodiment)
(Case C)

```
Portable Terminal (50)        MFP (10)                    AP (90)
```

Start Application → Display Instruction Screen

Probe Request(SSID-X) →
Probe Request(SSID-X) →
Probe Request(SSID-X) →  ← Connect Start Operation
Probe Request(SSID-X) →       Probe Request →
Probe Request(SSID-X) →
Probe Request(SSID-X) →
Probe Request(SSID-X) →  Start Soft AP
← Probe Response(SSID-X)

Connect Request ↔
Device Information →
← Device Information    Collect

Display SSID Select Screen
Select →
Display Wireless Setting Value Input Screen
Input →

Wireless Setting Value →    Connect ↔

← Result Information

Display Result    End Soft AP
← Disconnect →
                  Display Result

COMMUNICATION DEVICE

CROSS-REFERENCE TO RELATED APPLICATIONS

This application claims priority to Japanese Patent Application No. 2013-122864, filed on Jun. 11, 2013, the contents of which are hereby incorporated by reference into the present application.

TECHNICAL FIELD

The technology disclosed in the present specification relates to a communication device.

DESCRIPTION OF RELATED ART

A technique for newly adding a printer to a network including an access point is known. In this technique, a PC executes an ad-hoc communication with the printer to send, to the printer, setting data used for establishing a wireless connection with the access point. The printer establishes a wireless connection with the access point by using the setting data received from the PC.

SUMMARY

Techniques for newly adding a printer to a network comprising an access point are not limited to the above technique. A novel technique for establishing a wireless connection between a communication device and an access point is required. In the present specification, a novel communication device capable of establishing a wireless connection with an access point is presented.

One technique disclosed in the present application is a communication device. The communication device may comprise a processor, and a memory storing computer-readable instructions. The computer-readable instructions, when executed by the processor, cause the communication device to perform acquiring a specific instruction for establishing a wireless connection with a specific access point in accordance with an automatic wireless setting mode. The computer-readable instructions, when executed by the processor, cause the communication device to perform judging whether a specific wireless setting value for establishing the wireless connection with the specific access point is to be received from the specific access point or from a terminal device different from the specific access point, in a case where the specific instruction is acquired. The computer-readable instructions, when executed by the processor, cause the communication device to perform receiving the specific wireless setting value from the specific access point in a case where it is judged that the specific wireless setting value is to be received from the specific access point. The computer-readable instructions, when executed by the processor, cause the communication device to perform receiving the specific wireless setting value from the terminal device in a case where it is judged that the specific wireless setting value is to be received from the terminal device. The computer-readable instructions, when executed by the processor, cause the communication device to perform establishing the wireless connection with the specific access point by using the received specific wireless setting value.

Note that a controlling method, computer executable instructions, and a non-transitory computer readable medium for storing the computer executable instructions which are for realizing the communication device described above are newly useful. A communication system including the communication device, the access point and the terminal device is also newly useful.

BRIEF DESCRIPTION OF THE DRAWINGS

FIG. 9 shows a flowchart of a wireless connection process of an MFP of a fourth embodiment.
FIG. 10 shows a sequence chart of communication of case C of the fourth embodiment.

EMBODIMENTS

Figure 1:
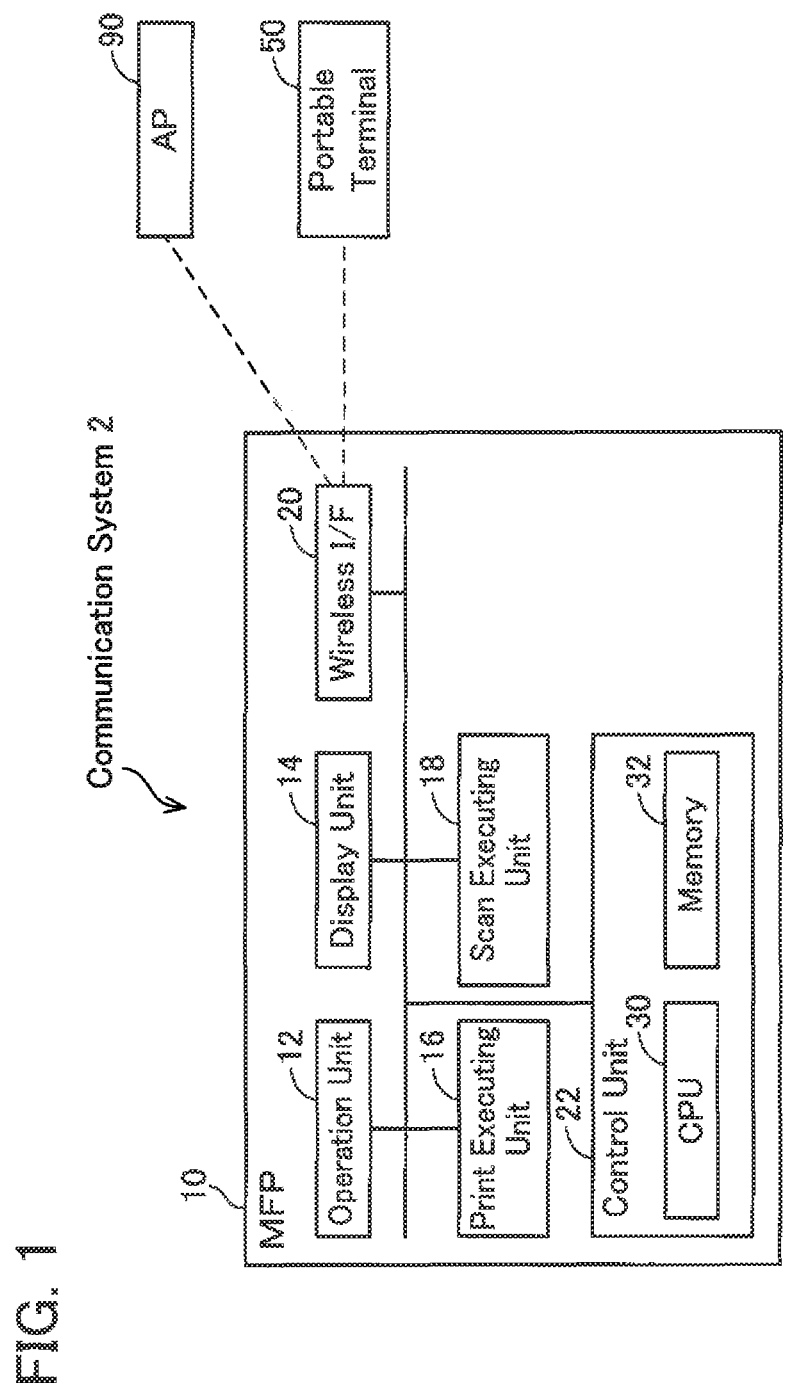
FIG. 1 shows the configuration of a communication system.

First Embodiment (Configuration of Communication System 2; FIG. 1)

As shown in FIG. 1, a communication system 2 comprises a multi-function peripheral (called "MFP (abbreviation of Multi-Function Peripheral)" below) 10, a portable terminal 50, and an AP (abbreviation of Access Point) 90.

The MFP 10 is capable of executing a wireless communication in accordance with a normal Wi-Fi scheme (e.g., a wireless communication in accordance with IEEE (The Institute of Electrical and Electronics Engineers, Inc.) 802. 11). For example, the MFP 10 can belong to a normal Wi-Fi network by establishing a connection (called "normal Wi-Fi connection" below) with the AP 90 in accordance with the normal Wi-Fi scheme. Thus, the MFP 10 can execute a wireless communication via the AP 90 with another device (not shown) belonging to the normal Wi-Fi network.

In the present embodiment, the MFP 10 can cause the MFP 10 itself to operate as a Soft AP. In this case, the MFP 10 can function as the AP, and can establish a normal Wi-Fi connection with the portable terminal 50 in accordance with the normal Wi-Fi scheme. Consequently, a normal Wi-Fi network including the MFP 10 and the portable terminal 50 can be constructed. That is, the MFP 10 operates as a parent station of the normal Wi-Fi network (i.e., the portable terminal 50 operates as a child station of the normal Wi-Fi network).

The normal Wi-Fi network which is constructed with the MFP 10 operating as the Soft AP is a different network from a normal Wi-Fi network including the AP 90. Below, the normal Wi-Fi network including the AP 90, and the normal Wi-Fi network which is constructed with the MFP 10 operating as the Soft AP may be called "normal Wi-Fi NW" and "Soft AP NW" respectively. Further, the normal Wi-Fi connection established between the MFP 10 and the AP 90, and the normal Wi-Fi connection established with the MFP 10 operating as the Soft AP are called "normal Wi-Fi connection" and "Soft AP connection" respectively.

(Configuration of MFP 10)

The MFP 10 comprises an operation unit 12, a display unit 14, a print executing unit 16, a scan executing unit 18, a wireless interface (called wireless I/F below) 20, and a control unit 22. The operation unit 12 comprises a plurality of keys. A user can input various instructions to the MFP 10 by operating the operation unit 12. By operating the operation unit 12, the user can input a predetermined operation (called "predetermined connect start operation" below) which is a trigger for starting a process for establishing a normal Wi-Fi connection between the MFP 10 and the AP 90. The display unit 14 is a display for showing various types of information. The print executing unit 16 is an ink jet method, laser method, etc. print mechanism. The scan executing unit 18 is a scan mechanism such as a CCD or CIS.

The wireless I/F 20 is an interface for executing a wireless communication relating to the normal Wi-Fi connection (i.e., a wireless communication with the AP 90), and a wireless communication relating to the Soft AP connection (i.e., a wireless communication executed as the Soft AP). The wireless I/F 20 is physically one interface. However, a MAC address for normal Wi-Fi connection (called "first MAC address" below), and a MAC address for Soft AP connection (called "second MAC address" below) are both assigned to the wireless LAN I/F 20. More specifically, the first MAC address is assigned in advance to the wireless I/F 20. The control unit 22 creates the second MAC address using the first MAC address, and assigns the second MAC address to the wireless I/F 20. The second MAC address is different from the first MAC address. Consequently, via the wireless I/F 20, the control unit 22 can simultaneously execute both a wireless communication relating to the normal Wi-Fi connection and a wireless communication relating to the Soft AP connection. Consequently, a situation can be established in which the MFP 10 belongs to both the normal Wi-Fi NW and the Soft AP NW. Moreover, in a variant, an interface for executing a wireless communication relating to the normal Wi-Fi connection, and an interface for executing a wireless communication relating to the Soft AP connection may be configured by physically different chips.

The control unit 22 comprises a CPU 30 and a memory 32. The CPU 30 executes various processes according to a program stored in the memory 32. The memory 32 is configured by a ROM, RAM, hard disk, etc. Further, the program includes an application program for causing the MFP 10 to operate as the Soft AP. The memory 32 further stores various data acquired or created in the course of the CPU 30 executing processes.

(Soft AP)

As will be described below, in the present embodiment, when the user executes the predetermined connect start operation in the operation unit 12, the MFP 10 operates as the Soft AP. Specifically, the CPU 30 of the MFP 10 starts an application for causing the MFP 10 to operate as the Soft AP. Below, the mode in which the MFP 10 functions as the Soft AP is called "Soft AP mode". An SSID (abbreviation of Service Set IDentifier), authentication method, encryption scheme, and password (i.e., wireless setting value) are assigned to the MFP 10 which is operating in Soft AP mode. The wireless setting value is set in advance in the memory 32 at the stage of shipping the MFP 10. Moreover, in another example, the wireless setting value may be generated in accordance with specific rules after the MFP 10 has been shipped. In this case, the generated wireless setting value is stored in the memory 32.

The MFP 10 which is operating in Soft AP mode exerts a similar function to a normal wireless access point (e.g., wireless access point, wireless LAN router, etc.). The MFP 10 which is operating in Soft AP mode can establish a Soft AP connection with the portable terminal 50. Thus, a Soft AP NW including the MFP 10 which is the parent station and the portable terminal 50 which is the child station is constructed. By using the Soft AP NW, the MFP 10 can execute a communication of data directly with the portable terminal 50 without going through another apparatus. Further, in a case where not only the portable terminal 50, but also another device belongs to the Soft AP NW as a child station, the MFP 10 can relay a communication between the pair of child stations belonging to the Soft AP NW (i.e., the portable terminal 50 and the other device).

(Configuration of Portable Terminal 50)

The portable terminal 50 is a portable terminal apparatus such as a mobile phone (e.g., a Smart Phone), PDA, notebook PC, tablet PC, portable music playback device, portable video playback device, etc. A memory of the portable terminal 50 stores an application program (called "connection application" below) for executing a process for establishing a normal Wi-Fi connection between the MFP 10 and the AP 90.

(Configuration of AP 90)

The AP 90 is a normal AP referred to as a wireless access point or wireless LAN router. The AP 90 can establish a normal Wi-Fi connection with a plurality of devices. Thus, a normal Wi-Fi NW which includes the AP 90 and the plurality of devices is constructed. The AP 90 relays a communication between a pair of devices (i.e., a pair of child stations) belonging to the normal Wi-Fi NW.

When a specific connect start operation (e.g., operation of a button) is performed on the AP 90, the operation mode of the AP 90 is set to an operation mode (called "WPS (abbreviation of Wi-Fi Protected Setup) mode" below) for automatically establishing a normal Wi-Fi connection with a target device of a connection target (e.g., the MFP 10). The AP 90 operating in WPS mode executes WPS negotiation with the target device. In the WPS negotiation, the SSID, authentication method, encryption scheme, and password (i.e., wireless setting value) currently being utilized by the AP 90 is sent to the target device from the AP 90. The target device receives the wireless setting value from the AP 90. Next, by using the wireless setting value, the target device and the AP 90 execute the various types of authentication needed to establish a normal Wi-Fi connection. When all the authentication has succeeded, a normal Wi-Fi connection is established between the AP 90 and the target device.

Figure 2:
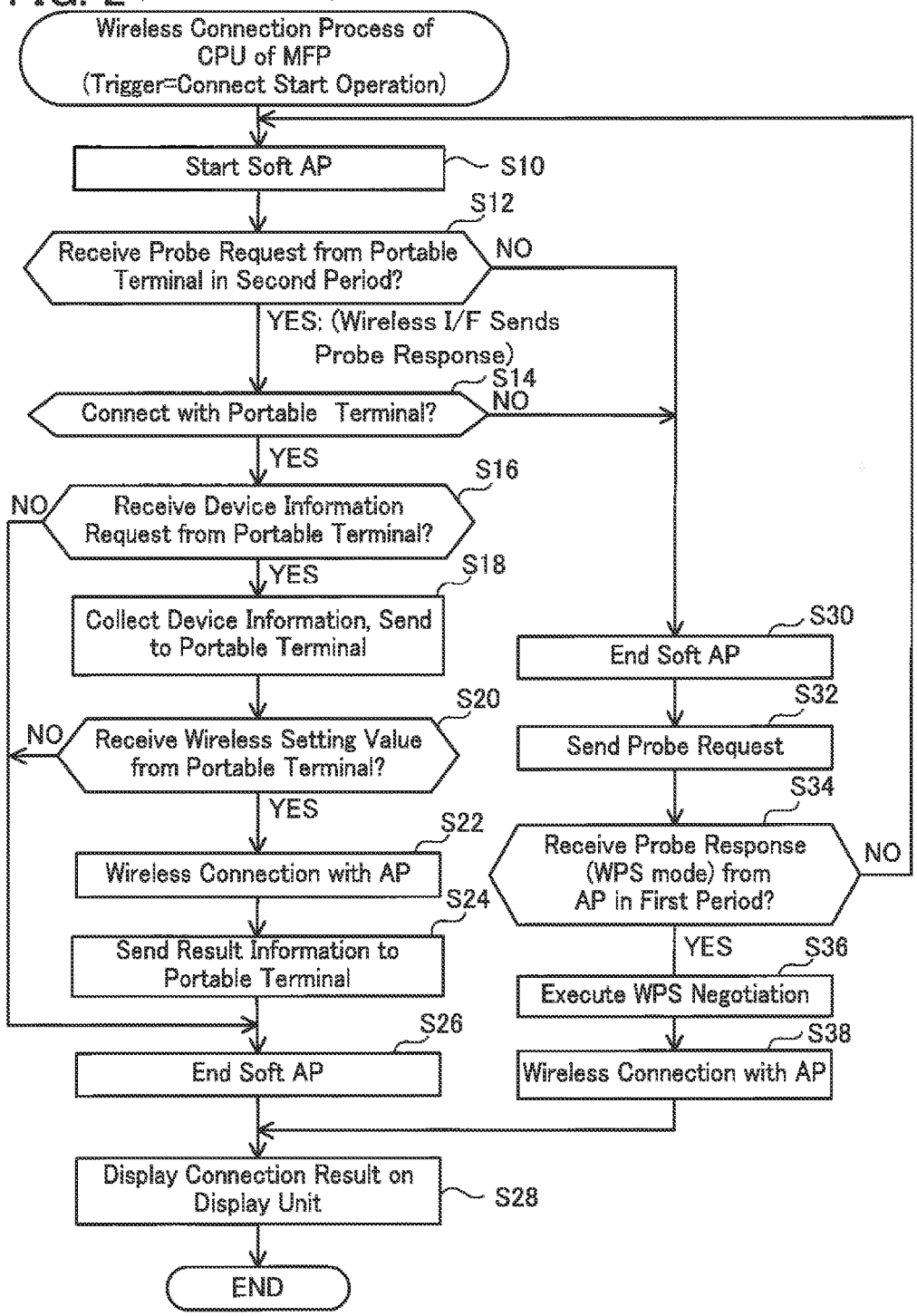
FIG. 2 shows a flowchart of a wireless connection process of an MFP of a first embodiment.

(Wireless Connection Process of CPU 30 of MFP 10; FIG. 2)

Next, contents of a wireless connection process executed by the CPU 30 of the MFP 10 will be described with reference to FIG. 2. When a predetermined connect start operation is performed on the operation unit 12 of the MFP 10, the CPU 30 acquires an instruction given by that operation. In this case, in S10, the CPU 30 starts the Soft AP, and sets the operation mode of the MFP 10 to Soft AP mode.

Next, in S12, the CPU 30 monitors whether a Probe Request signal is received from the portable terminal 50 before a predetermined period (e.g., 30 seconds; called "second period" below) has elapsed since starting the Soft AP in S10.

A user of the portable terminal 50 can operate an operation unit (not shown) of the portable terminal 50, starting the connection application. In this case, in accordance with the connection application, the portable terminal 50 wirelessly sends the Probe Request signal including the SSID (i.e., the predetermined SSID) of the MFP 10 which is operating in Soft AP mode. The SSID when the MFP 10 is operating as the Soft AP is preset in the connection application of the portable terminal 50. Consequently, the portable terminal 50 can send the Probe Request signal which includes the SSID of the MFP 10.

Upon receiving the Probe Request signal from the portable terminal 50, the wireless I/F 20 of the MFP 10 sends a Probe Response signal to the portable terminal 50. Moreover, the sending of the Probe Response signal is not a process executed by the CPU 30 of the MFP 10, but is executed automatically by the wireless I/F 20. The wireless I/F 20 supplies a reception notification indicating the reception of the Probe Request signal to the CPU 30 from the portable terminal 50. The reception notification includes the SSID of the MFP 10 included in the Probe Request signal. In case of receiving the reception notification including the SSID of the MFP 10 from the wireless I/F 20 before the second period from starting the Soft AP in S10 has elapsed, the CPU 30 determines YES in S12, and proceeds to S14.

In a situation where the user has not started the connection application of the portable terminal 50, a Probe Request signal is not sent from the portable terminal 50. Consequently, the CPU 30 does not receive a reception notification including the SSID of the MFP 10 from the wireless I/F 20 before the second period from starting the Soft AP in S10 has elapsed. In this case, the CPU 30 determines NO in S12, and proceeds to S30.

In S14, the CPU 30 monitors establishment of a Soft AP connection between the MFP 10 and the portable terminal 50. Specifically, in S14, the CPU 30 sends the SSID, authentication method, encryption scheme, and password (i.e., wireless setting value) assigned to the MFP 10 operating as the Soft AP to the portable terminal 50. Thereupon, by using the wireless setting value, the CPU 30 executes the authentication determined in advance. In case all the authentication succeeds, the Soft AP connection between the MFP 10 and the portable terminal 50 is established. That is, a Soft AP NW including the MFP 10 which is the parent station and the portable terminal 50 which is the child station is constructed. In this case, the CPU 30 determines YES in S14, and proceeds to S16.

For example, if the power of the portable terminal 50 is turned OFF while the authentication of S14 is being executed, or if the communication environment between the MFP 10 and the portable terminal 50 has deteriorated, the Soft AP connection between the MFP 10 and the portable terminal 50 is not established. In this case, the CPU 30 determines NO in S14, and proceeds to S30.

In S16, the CPU 30 monitors whether a device information request is received from the portable terminal 50. When a Soft AP connection between the MFP 10 and the portable terminal 50 is established, the portable terminal 50 sends the device information request to the MFP 10 by using the Soft AP NW, in accordance with the connection application. The device information request is a signal for requesting sending of device information (i.e., SSID, authentication method, and encryption scheme) of one or more APs which exist around the MFP 10. Upon receiving the device information request from the portable terminal 50, the CPU 30 determines YES in S16, and proceeds to S18. On the other hand, in case of not receiving device information from the portable terminal 50 within the predetermined period (e.g., in case the communication environment between the MFP 10 and the portable terminal 50 is poor), the CPU 30 determines NO in S16, and proceeds to S26.

In S18, the CPU 30 collects the device information from each of the one or more APs (the AP 90, etc.) which exist around the MFP 10. Specifically, in S18, the CPU 30 first wirelessly broadcasts a Probe Request signal. Upon receiving the Probe Request signal, the APs which exist around the MFP 10 (the AP 90, etc.) send, to the MFP 10, a Probe Response signal which includes the SSID, authentication method, and encryption scheme (i.e., device information) currently being utilized by those APs. However, the APs do not send the password currently being utilized by the APs to the MFP 10. Next, by using the Soft AP NW, the CPU 30 sends the device information of the APs which exist around the MFP 10 to the portable terminal 50.

Figure 3:
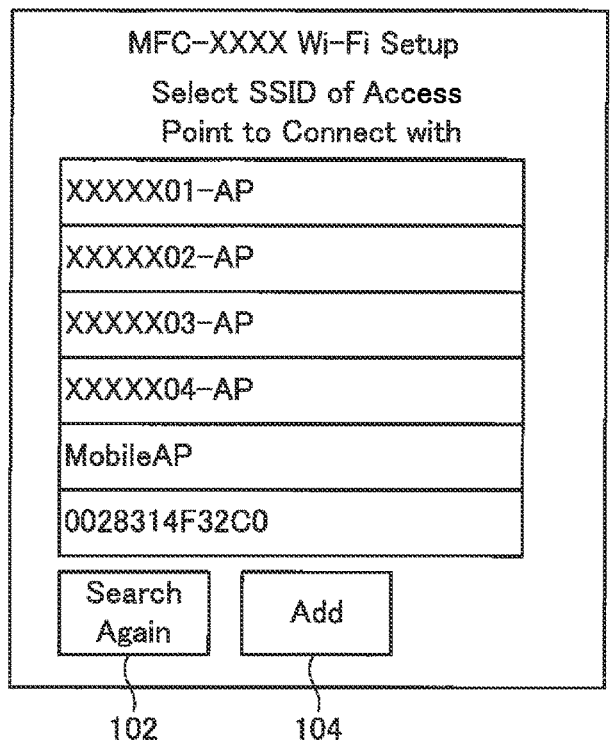
FIG. 3 shows an example of an SSID select screen.

Upon receiving the device information of the APs from the MFP 10, the portable terminal 50 causes a display unit (not shown) of the portable terminal 50 to display, in accordance with the connection application, an SSID select screen shown in FIG. 3. The SSID select screen displays a list of SSIDs (e.g., "XXXXX02-AP", etc.) of the APs included in the received device information. The user operates the operation unit (not shown) of the portable terminal 50 to select one SSID (e.g., "XXXXX02-AP") from among the one or more SSIDs displayed in the SSID select screen. That is, in case of wishing to connect the MFP 10 to the AP 90, the user selects the SSID of the AP 90 from the list of SSIDs of FIG. 3. Below, the explanation will be continued using a case, as an example, where the SSID of the AP 90 has been selected. Moreover, the SSID select screen of FIG. 3 further includes a search again button 102, for causing the MFP 10 to again collect the one or more device information of the one or more APs which exist around the MFP 10, and an add button 104 for adding an AP (i.e., SSID) which is not being displayed in the SSID select screen.

Figure 4:
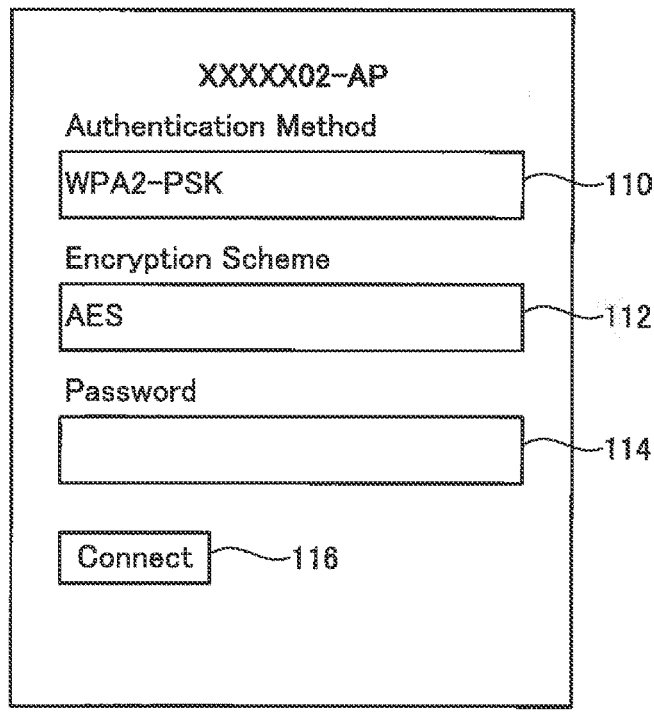
FIG. 4 shows an example of a wireless setting value input screen.

Upon selection of the SSID of the AP 90, the portable terminal 50 causes the display unit of the portable terminal 50 to display, in accordance with the connection application, a wireless setting value input screen of FIG. 4. The wireless setting value input screen includes the SSID of the AP 90 ("XXXXX02-AP") selected in the SSID select screen of FIG. 3, an authentication method input field 110, an encryption scheme input field 112, a password input field 114, and a connection button 116.

As described above, the portable terminal 50 receives, from the AP 90, not only the SSID of the AP 90, but also the authentication method and encryption scheme currently being utilized by the AP 90. The portable terminal 50 inputs (displays) the authentication method (e.g., "WPA2-PSK") received from the AP 90 in the authentication method input field 110, and inputs (displays) the encryption scheme (e.g., "AES") received from the AP 90 in the encryption scheme input field 112. Moreover, the password input field 114 is blank. The user of the portable terminal 50 inputs the password currently being utilized by the AP 90 into the password input field 114, and selects the connection button 116. In this case, by using the Soft AP NW, the portable terminal 50 sends the wireless setting value to the MFP 10, this wireless setting value including the selected SSID of the AP 90, and the information (i.e., authentication method, encryption scheme, and password) input into the fields 110-114 of FIG. 4. As described above, the portable terminal 50 receives the SSID of the AP 90, authentication method, and encryption scheme from the AP 90. Consequently, the user does not need to input the SSID of the AP 90, the authentication method, and the encryption scheme into the SSID select screen. The user only needs to input the password into the password input field 114 of the SSID select screen.

On the other hand, in some cases the add button 104 is pressed without selecting any SSID from the plurality of SSIDs displayed in the SSID select screen of FIG. 3. In this case, the portable terminal 50 causes the display unit to display a specific input screen (not shown) different from FIG. 4. The user inputs, into the input fields in the specific input screen, the SSID of an AP with which establishment of a normal Wi-Fi connection is desired, and the authentication method, encryption scheme, and password. In this case, also, the portable terminal 50 sends the SSID, authentication method, encryption scheme, and password (i.e., wireless setting value) input into the specific input screen to the MFP 10 by using the Soft AP NW.

In S20 of FIG. 2, by using the Soft AP NW, the CPU 30 monitors whether the wireless setting value is received from the portable terminal 50. Upon receiving the wireless setting value from the portable terminal 50, the CPU 30 determines YES in S20, and proceeds to S22. On the other hand, in case of not receiving the wireless setting value from the portable terminal 50 within the predetermined period (e.g., in case the communication environment between the MFP 10 and the portable terminal 50 is poor), the CPU 30 determines NO in S20, and proceeds to S26.

In S22, the CPU 30 attempts to establish a normal Wi-Fi connection with the AP 90 by using the received wireless setting value (i.e., SSID, authentication method, encryption scheme, and password). Specifically, in S22, the CPU 30 sends the received wireless setting value to the AP 90. Thus, the AP 90 judges whether the wireless setting value matches the wireless setting value currently being utilized in the AP 90 itself (i.e., the wireless setting value currently being utilized in the normal Wi-Fi NW formed by the AP 90) (i.e., executes authentication). If the authentication succeeded, a normal Wi-Fi connection is established between the MFP 10 and the AP 90. That is, the MFP 10 can belong, as a child station, to the normal Wi-Fi NW formed by the AP 90. On the other hand, if the authentication did not succeed, the normal Wi-Fi connection is not established.

Next, in S24, by using the Soft AP NW, the CPU 30 sends result information to the portable terminal 50 indicating whether a normal Wi-Fi connection has been established. That is, in case the normal Wi-Fi connection was established, the CPU 30 sends result information to the portable terminal 50 which includes success information indicating that connection succeeded, and in case the normal Wi-Fi connection was not established, sends result information to the portable terminal 50 which includes failure information indicating that connection failed.

Upon receiving the result information from the MFP 10, the portable terminal 50 causes the display unit of the portable terminal 50 to display, in accordance with the connection application, a connection result indicating the result information (i.e., a message indicating whether the normal Wi-Fi connection has been established). Consequently, in the present embodiment, the user of the terminal device can learn, by looking at the display unit, whether the normal Wi-Fi connection has been established between the MFP 10 and the AP.

In S26, the CPU 30 ends the application started in S10. In this case, the Soft AP mode of the MFP 10 ends. Consequently, the Soft AP connection between the MFP 10 and the portable terminal 50 is disconnected, and the Soft AP NW disappears. Upon completion of the process of S26, processing proceeds to S28.

On the other hand, in S30 (the case of NO in S12, or the case of NO in S14), the CPU 30 ends the application started in S10. Since the process of S30 is the same as the process of S26, a detailed description thereof is omitted.

Next, in S32, the CPU 30 wirelessly broadcasts a Probe Request signal. In S34, the CPU 30 monitors whether a Probe Response signal, this including information indicating that the AP 90 is operating in WPS mode, is received from the AP 90 that is operating in WPS mode before a predetermined period (e.g., 60 seconds; called "first period" below) has elapsed since the broadcasting the Probe Request signal in S32. Upon receiving a Probe Request signal from the surroundings, the APs (e.g., the AP 90) which exist around the MFP 10, while being activated, send a Probe Response signal to the MFP 10. In particular, if, for example the specific connect start operation is executed on the AP 90, the AP 90 operates in the WPS mode and, in this case, sends the MFP 10 the Probe Response signal which includes information indicating that the AP 90 is operating in WPS mode. However, if the specific connect start operation is not executed on the AP 90, the AP 90 sends the MFP 10 a Probe Response signal which does not include information indicating that the AP 90 is operating in WPS mode. Moreover, below, the Probe Response signal which includes information indicating operation in WPS mode is described as "Probe Response signal (WPS mode)".

In case of receiving the Probe Response signal (WPS mode) from the AP 90 before the first period has elapsed since the broadcasting of the Probe Request signal in S32, the CPU 30 determines YES in 834, and proceeds to S36. On the other hand, in case of not receiving the Probe Response signal (WPS mode) before the first period has elapsed since the broadcasting of the Probe Request signal in S32, the CPU 30 determines NO in S34, and returns to S10.

In S36, the CPU 30 executes a WPS negotiation with the AP 90 which is the source of the received Probe Response signal (WPS mode) (i.e., with the AP 90 operating in WPS mode). In the WPS negotiation, the CPU 30 receives the SSID, authentication method, encryption scheme, and password (i.e., wireless setting value) from the AP 90. By using the received wireless setting value, the CPU 30 executes various authentications with the AP. If all the authentications succeed, in S38 the CPU 30 establishes a normal Wi-Fi connection with the AP 90. That is, the MFP 10 can belong as a child station to the normal Wi-Fi NW formed by the AP 90. Upon completion of the process of S38, processing proceeds to S28. As described above, in the present embodiment, the MFP 10 acquires the wireless setting value from the AP 90, and can establish the normal Wi-Fi connection with the AP by utilizing the acquired wireless setting value. Consequently, compared with a configuration in which a wireless setting value is stored in advance in the memory 32, connection with the AP 90 operating in WPS mode can be executed properly.

In S28, the CPU 30 causes the display unit 14 to display the connection result (i.e., a message indicating whether the normal Wi-Fi connection has been established). Upon ending S28, the CPU 30 ends the wireless connection process of FIG. 2.

As described above, in the present embodiment, in case of receiving the Probe Request signal from the portable terminal 50 before the second period has elapsed since starting the Soft AP in S10 of FIG. 2, the MFP 10 judges that the wireless setting value is to be received from the portable terminal 50 (YES in S12). Further, in case of receiving the Probe Response signal (WPS mode) from the AP 90 before the first period has elapsed since the broadcasting of the Probe Request signal in S32, the MFP 10 judges that the wireless setting value is to be received from the AP 90 (YES in S34). Thus, the MFP 10 can appropriately judge whether the wireless setting value for establishing the normal Wi-Fi connection with the AP 90 is to be received from the AP 90 or is to be received from the portable terminal 50.

Further, in the present embodiment, in case of not receiving the Probe Request signal from the portable terminal 50 before the second period has elapsed since being set to Soft AP mode in S10 of FIG. 2 (NO in S12), the MFP 10 ends the Soft AP mode (S30), and shifts to a mode (S32, S34) for monitoring reception of the Probe Response signal (WPS mode) from the AP 90. Further, in case of not receiving a Probe Response signal (WPS mode) from the AP 90 before the first period has elapsed since the broadcasting of the Probe Request signal in S32 (NO in S34), the MFP 10 again shifts to Soft AP mode (S10). That is, the MFP 10 can alternately execute the Soft AP mode in which the reception of the Probe Request signal from the portable terminal 50 is monitored, and the mode in which the reception of the Probe Response signal (WPS mode) from the AP 90 is monitored. Consequently, the MFP 10 can appropriately receive the wireless setting value from the portable terminal 50 or the AP 90 and establish the normal Wi-Fi connection with the AP 90 in either the situation of the user starting the connection application of the portable terminal 50, or the situation of the user executing the specific connect start operation of the AP 90. Conventionally, an MFP is known which automatically attempts to receive the wireless setting value from the AP in case an operation unit is operated. By contrast, the MFP 10 of the present embodiment judges whether the wireless setting value is to be received from the portable terminal 50 or the wireless setting value is to be received from the AP 90 in case the operation unit 12 is operated. Consequently, the MFP 10 of the present embodiment can appropriately receive the wireless setting value from the portable terminal 50 or the AP 90, and establish a normal Wi-Fi connection with the AP 90.

Figure 5:
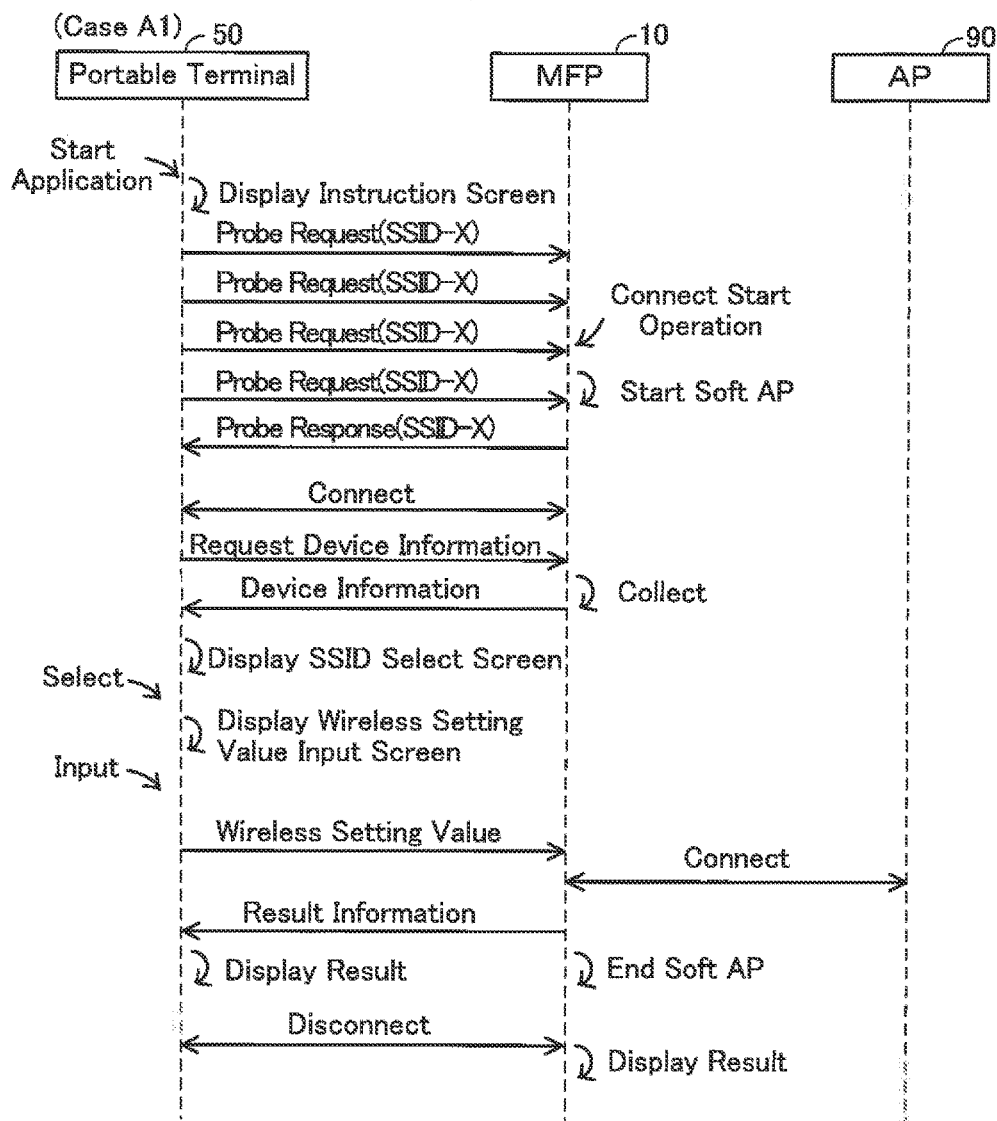
FIG. 5 shows a sequence chart of communication of case A1 of the first embodiment.

(Case A1; FIG. 5)

Next, a specific case A1 realized by the present embodiment will be described with reference to FIG. 5. In case A1, the MFP 10 receives a wireless setting value from the portable terminal 50, and establishes a normal Wi-Fi connection with the AP 90 by utilizing the received wireless setting value.

In case A1, the user first operates the operation unit of the portable terminal 50, executing a start application operation for starting the connection application. When the start application operation is executed, the portable terminal 50 starts the connection application. Upon starting the connection application, the portable terminal 50 causes the display unit of the portable terminal 50 to display an instruction screen which includes a message for prompting the user to execute the predetermined connect start operation in the operation unit 12 of the MFP 10. Thereupon, the portable terminal 50 sends the Probe Request signal which includes the SSID of the MFP 10 which is operating in the Soft AP mode (the value "SSID-X" determined in advance). In the example of FIG. 5, the portable terminal 50 repeatedly sends the Probe Request signal each predetermined period. Moreover, below, the inclusion of "SSID-X" in the Probe Request signal or Probe Response signal may be expressed as "Probe Request signal (SSID-X)" or "Probe Response signal (SSID-X)".

On the other hand, the user executes the predetermined connect start operation in the operation unit 12 of the MFP 10. The MFP 10 starts the Soft AP, and sets the operation mode of the MFP 10 to the Soft AP mode (S10 of FIG. 2). Thus, the MFP 10 operates as the AP to which the SSID "SSID-X" was assigned. Upon starting operation in the Soft AP mode, the MFP 10 receives the Probe Request signal (SSID-X) sent by the portable terminal 50 (YES in S12 of FIG. 2), and sends the Probe Response signal (SSID-X) that includes "SSID-X" to the portable terminal 50 (YES in S12 of FIG. 2).

Next, the MFP 10 establishes a Soft AP connection with the portable terminal 50 (YES in S14 of FIG. 2). Thus, a Soft AP NW including the MFP 10 and the portable terminal 50 is constructed. Next, by using the Soft AP NW, the portable terminal 50 sends a device information request to the MFP 10.

Upon receiving the device information request (YES in S16 of FIG. 2), the MFP 10 collects the device information from the respective one or more APs (the AP 90, etc.) which exist around the MFP 10, and sends the collected one or more device information to the portable terminal 50 by using the Soft AP NW (818 of FIG. 2).

Upon receiving the one or more device information, the portable terminal 50 causes the display unit to display the SSID select screen (see FIG. 3). The user operates the operation unit of the portable terminal 50 to select the SSID of the AP 90 ("XXXXX02-AP") from among the one or more SSIDs displayed on the SSID select screen. Upon selection of the SSID of the AP 90, the portable terminal 50 causes the display unit to display the wireless setting value input screen (see FIG. 4). The authentication method ("WPA2-PSK") and encryption scheme ("AES") currently being utilized by the AP 90 have been input in advance into the authentication method input field 110 and the encryption scheme input field 112 of the wireless setting value input screen. The user operates the operation unit of the portable terminal 50 to input the password currently being utilized by the AP 90 into the password input field 114, and presses the connection button 116.

The portable terminal 50 sends the wireless setting value (i.e., the SSID of the AP 90, and the authentication method, encryption scheme, and password input into the fields 110-114 of FIG. 4) to the MFP 10 by using the Soft AP NW. Upon receiving the wireless setting value (YES in 820 of FIG. 2), the MFP 10 establishes the normal Wi-Fi connection with the AP 90 by utilizing the received wireless setting value (S22 of FIG. 2). Thus, a normal Wi-Fi NW which includes the MFP 10 and the AP 90 is constructed.

Next, the MFP 10 sends result information including success information indicating that connection succeeded to the portable terminal 50 by using the Soft AP NW. Upon receiving the result information, the portable terminal 50 causes the display unit to display a connection result indicating that a normal Wi-Fi connection has been established.

Upon sending the result information, the MFP 10 ends the Soft AP. Thus, the Soft AP connection between the MFP 10 and the portable terminal 50 is disconnected, and the Soft AP NW disappears. Next, the MFP 10 causes the display unit 14 to display the connection result indicating that the normal Wi-Fi connection has been established.

Figure 6:
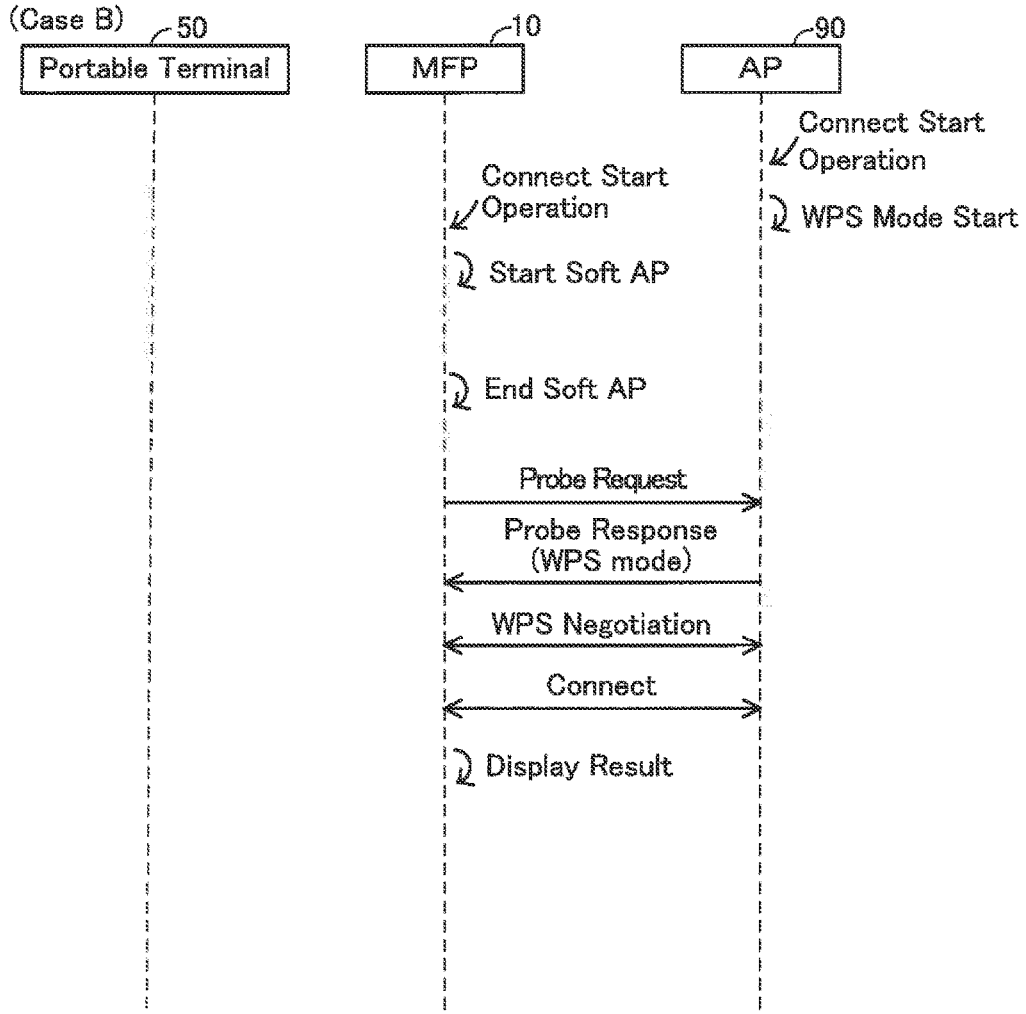
FIG. 6 shows a sequence chart of communication of case B of the first embodiment.

(Case B; FIG. 6)

Next, a specific case B realized by the present embodiment will be described with reference to FIG. 6. In case B, the user executes the specific connect start operation in the AP 90. In this case, the AP 90 sets the operation mode of the AP 90 to WPS mode.

Next, the user executes the predetermined connect start operation in the operation unit 12 of the MFP 10. The MFP 10 starts the Soft AP, and sets the operation mode of the MFP 10 to Soft AP mode (S10 of FIG. 2). Consequently, as in case A1, the MFP 10 operates as the AP to which the SSID "SSID-X" was assigned. However, in the present case B, the connection application is not started in the portable terminal 50. Consequently, the MFP 10 does not receive the Probe Request signal from the portable terminal 50 before the second period since starting the Soft AP has elapsed (NO in S12 of FIG. 2). Consequently, the MFP 10 ends the Soft AP after the second period has elapsed (S30 of FIG. 2). Next, the MFP 10 broadcasts the Probe Request signal. Upon receiving the Probe Request signal, the AP 90 operating in the WPS mode sends the Probe Response signal (WPS mode) to the MFP 10.

Upon receiving the Probe Response signal (WPS mode), the MFP 10 executes the WPS negotiation with the AP 90 which is the source of the Probe Response signal (WPS mode), and receives the SSID, authentication method, encryption scheme, and password (i.e., the wireless setting value) from the AP 90. By using the received wireless setting value, the MFP 10 executes various authentications with the AP. If all the authentications are successful, the normal Wi-Fi connection between the MFP 10 and the AP 90 is established. Next, the MFP 10 causes the display unit 14 to display the connection result indicating that the normal Wi-Fi connection has been established.

(Effects of Present Embodiment)

As described above, in the present embodiment, in the case of wanting to connect the MFP 10 to the AP 90, the user can start the connection application of the portable terminal 50, as shown in case A1 of FIG. 5, and can execute the specific connect start operation in the AP 90, as shown in case B of FIG. 6. For this purpose, the MFP 10 judges (S12, S34 of FIG. 2) whether the wireless setting value for establishing a normal Wi-Fi connection with the AP 90 is to be received from the portable terminal 50 (i.e., whether the situation is the user starting the connection application of the portable terminal 50), or whether the wireless setting value is to be received from the AP 90 (i.e., whether the situation is the user executing the specific connect start operation in the AP 90). Then, the MFP 10 can appropriately receive the wireless setting value from the device corresponding to the determination result (i.e., the AP 90 or the portable terminal 50). Thus, the MFP 10 can appropriately establish a normal Wi-Fi connection with the AP 90 by using the received wireless setting value (S22, S38 of FIG. 2).

(Corresponding Relationships)

The MFP 10, the AP 90, the portable terminal 50 are respectively examples of the "communication device", the "specific access point", and the "terminal device". The wireless setting value for establishing a normal Wi-Fi connection between the MFP 10 and the AP 90 is an example of the "specific wireless setting value". Further, the one or more device information sent by the MFP 10 to the portable terminal 50 is an example of the "one or more partial setting values". The instruction issued by the predetermined connect start operation executed by the operation unit 12 of the MFP 10 is an example of the "specific instruction". The mode in which the Probe Request signal is broadcast in S32 and the reception of the Probe Response signal (WPS mode) is monitored in S34 is an example of the "first operation mode". The Soft AP mode is an example of the "second operation mode". Further, the Probe Response signal (WPS mode) is an example of the "first signal". The Probe Request signal received in S12 is an example of the "second signal". The Probe Request signal sent in S32 is an example of the "specific request signal". Acquiring the instruction issued by the predetermined connect start operation executed by the operation unit 12 of the MFP 10 is an example of "acquiring". The processes of S12, S34 of FIG. 2 are examples of "judging". The processes of S36, S38 are examples of "receiving the specific wireless setting value from the specific access point" and "establishing the wireless connection with the specific access point by using the specific wireless setting value received from the specific access point". The process of S22 is an example of "establishing the wireless connection with the specific access point by using the specific wireless setting value received from the terminal device". The process of S24 is an example of "sending success information" and "sending failure information". In the process of S18, the process of collecting the device information of the APs which exist around the MFP 10 is an example of "receiving the specific wireless setting value from the terminal device". In the process of S18, the process of sending the device information of the APs which exist around the MFP 10 to the portable terminal 50 is an example of the process executing "sending one or more the partial setting values".

Second Embodiment

The description for the second embodiment will be given focusing on points different from the first embodiment. As described above, in the first embodiment, when the predetermined connect start operation is executed in the operation unit 12 of the MFP 10, the MFP 10 operates in the Soft AP mode (S10 of FIG. 2). Then, when the MFP 10 receives a Probe Request signal from the portable terminal 50 (YES in S12), a Soft AP connection between the MFP 10 and the portable terminal 50 is established (YES in S14). The portable terminal 50 sends the wireless setting value to the MFP 10 by using the Soft AP NW. Instead of this, in the present embodiment, when the predetermined connect start operation is executed in the operation unit 12 of the MFP 10, the MFP 10 operates in an operation mode (called "ad-hoc mode" below) which is capable of executing a wireless communication according to an ad-hoc scheme (called "ad-hoc communication" below). In the present embodiment, the MFP 10 and the portable terminal 50 establish a connection according to the ad-hoc scheme (called "ad-hoc connection" below). In the present embodiment, the portable terminal 50 sends the wireless setting value to the MFP 10 by using an ad-hoc network (called "ad-hoc NW" below) formed with the MFP 10. In the present embodiment, the MFP 10 and the portable terminal 50 (see FIG. 1) are both devices capable of executing ad-hoc communication.

(Ad-Hoc)

Next, ad-hoc will be described. An ad-hoc wireless network is formed by a pair of devices different from an AP. Specifically, one device prepares normal Wi-Fi WSI (Wireless Setting Information) to be utilized in the ad-hoc wireless network, and supplies the normal Wi-Fi WSI to the other device. Thus, the pair of devices executes an authentication communication, and can establish a connection according to the ad-hoc. That is, the pair of devices can belong to a normal Wi-Fi NW without utilizing a normal AP or Soft AP mode.

Figure 7:
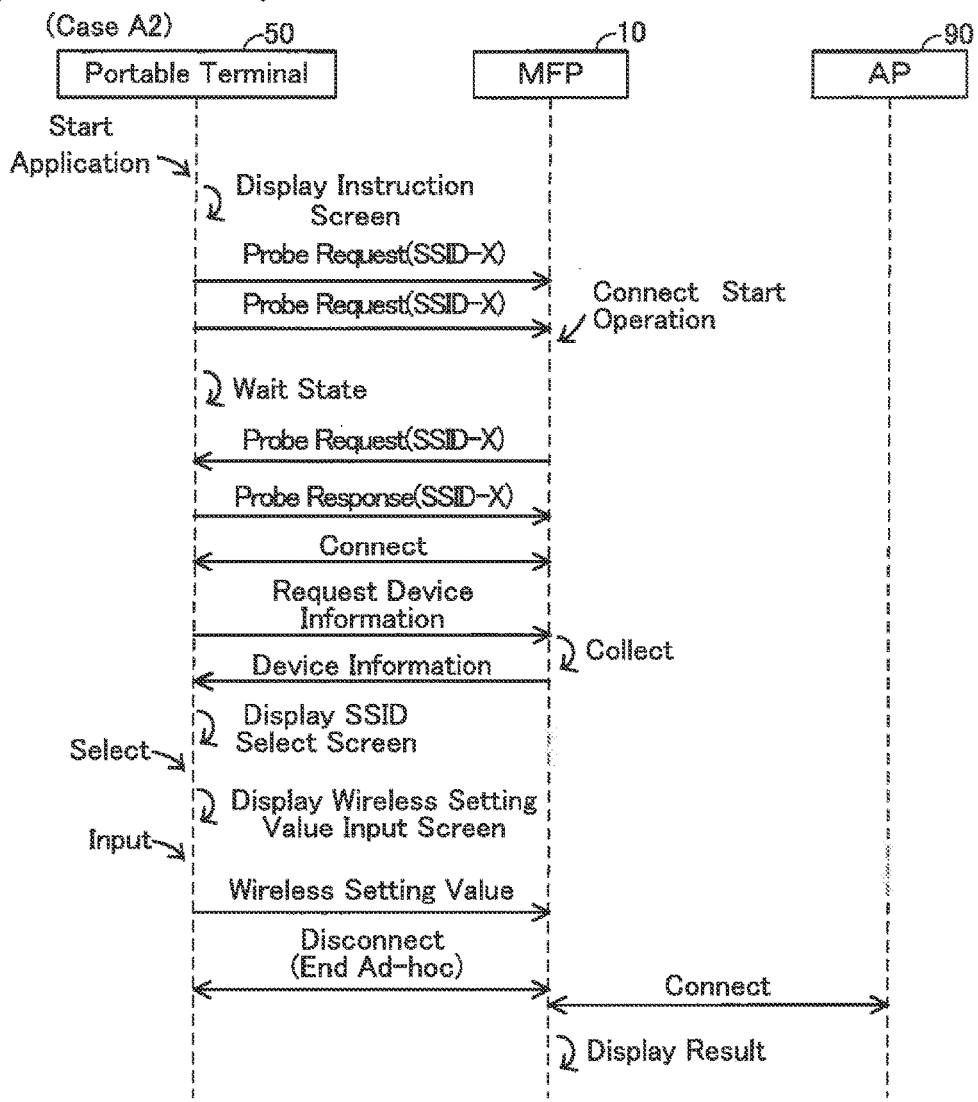
FIG. 7 shows a sequence chart of communication of case A2 of a second embodiment.

(Case A2; FIG. 7)

Next, a specific case A2 realized by the present embodiment will be described with reference to FIG. 7. In case A2, as in case A1 (FIG. 5), the MFP 10 receives a wireless setting value from the portable terminal 50, and establishes a normal Wi-Fi connection with the AP 90 by utilizing the received wireless setting value.

In case A2 also, the user first operates the operation unit of the portable terminal 50 to execute the start application operation for starting the connection application. When the start application operation is executed, the portable terminal 50 starts the connection application. When the connection application has been started, the portable terminal 50 operates in the ad-hoc mode. The predetermined SSID "SSID-X" is assigned to the portable terminal 50 that is operating in the ad-hoc mode. The portable terminal 50 causes the display unit of the portable terminal 50 to display an instruction screen which includes a message for prompting the user to execute the predetermined connect start operation in the operation unit 12 of the MFP 10. Thereupon, the portable terminal 50 sends a Probe Request signal (SSID-X) which includes the SSID ("SSID-X") of the ad-hoc NW being stored in the portable terminal 50. In the example of FIG. 7, the portable terminal 50 repeatedly sends the Probe Request signal (SSID-X) each predetermined period. At this point, since the MFP 10 is not operating in the ad-hoc mode, the portable terminal 50 cannot receive the Probe Response signal (SSID-X). In case A2, the portable terminal 50 then shifts to wait state, and monitors the presence of another device that operates in the ad-hoc mode (e.g., the MFP 10).

On the other hand, the user executes the predetermined connect start operation in the operation unit 12 of the MFP 10. When the predetermined connect start operation is executed, the MFP 10 operates in the ad-hoc mode. The MFP 10 sends a Probe Request signal (SSID-X) which includes the SSID (the value "SSID-X" determined in advance) of the ad-hoc NW which is being stored in the memory 32. In the present case A2, the portable terminal 50 in the wait state is present at this time. Upon receiving the Probe Request signal (SSID-X) from the MFP 10, the portable terminal 50 sends a Probe Response signal (SSID-X) to the MFP 10.

The MFP 10 can detect that the portable terminal 50 in the wait state is present by receiving the Probe Response signal (SSID-X) from the portable terminal 50. Next, the MFP 10 executes required authentication communication with the portable terminal 50, establishing an ad-hoc connection. Thus, an ad-hoc NW is formed between the MFP 10 and the portable terminal 50.

Next, the portable terminal 50 sends a device information request to the MFP 10 by using the ad-hoc NW. Upon receiving the device information request, the MFP 10 collects the device information from the respective one or more APs (the AP 90, etc.) which exist around the MFP 10, and sends the collected one or more device information to the portable terminal 50 by using the ad-hoc NW.

In case A2, also, upon receiving the one or more device information, the portable terminal 50 causes the display unit to display the SSID select screen (see FIG. 3). The user operates the operation unit of the portable terminal 50 to select the SSID of the AP 90 from among the one or more SSIDs displayed in the SSID select screen. Upon selection of the SSID of the AP 90, the portable terminal 50 causes the display unit to display the wireless setting value input screen (see FIG. 4). In the present case A2, also, the user operates the operation unit of the portable terminal 50 to input the predetermined password of the AP 90 into the password input field 114, and presses the connection button 116.

When the connection button 116 is pressed, the portable terminal 50 sends the wireless setting value to the MFP 10 by using the ad-hoc NW. In the present case A2, the MFP 10 disconnects the ad-hoc connection with the portable terminal 50 upon receiving the wireless setting value. That is, the MFP 10 ends the ad-hoc mode. Next, the MFP 10 establishes a normal Wi-Fi connection with the AP 90 by utilizing the received wireless setting value. Thus, a normal Wi-Fi NW including the MFP 10 and the AP 90 is constructed. Generally, ad-hoc connections and normal Wi-Fi connections are executed in accordance with different standards (ad-hoc standard and infrastructure standard). In the present embodiment, the wireless I/F 20 cannot simultaneously establish two types of wireless connection which are executed in accordance with different standards. Consequently, as described above, in case A2, the MFP 10 disconnects the ad-hoc connection with the portable terminal 50 before establishing a normal Wi-Fi connection with the AP 90.

As described above, in case A2, the ad-hoc NW has disappeared at the time when the normal Wi-Fi connection was established between the MFP 10 and the AP 90. Consequently, the MFP 10 does not send, to the portable terminal 50, result information including success information indicating that connection succeeded. However, the MFP 10 causes the display unit 14 to display a connection result indicating that the normal Wi-Fi connection has been established.

(Corresponding Relationships)

The ad-hoc mode of the MFP 10 is an example of the "second operation mode". The Probe Response signal (SSID-X) of case A2 of FIG. 7 is an example of the "second signal".

Third Embodiment

The description for the third embodiment will be given focusing on points different from the first embodiment. In the present embodiment, when the predetermined connect start operation is executed in the operation unit 12 of the MFP 10, the MFP 10 operates in an operation mode (called "WFD mode" below) which is capable of executing a wireless communication (called "WFD communication" below) according to a WFD (abbreviation of Wi-Fi Direct) scheme. In the present embodiment, the MFP 10 and the portable terminal 50 establish a connection according to the WFD scheme (called "WFD connection" below). In the present embodiment, the portable terminal 50 sends the wireless setting value to the MFP 10 by using a WFD network formed with the MFP 10 (called "WFD NW" below). In the present embodiment, the MFP 10 and the portable terminal 50 (see FIG. 1) are both devices capable of executing WFD communication.

(WFD)

Next, WFD is explained. WFD is a standard formulated by Wi-Fi Alliance. WFD is described in "Wi-Fi Peer-to-Peer (P2P) Technical Specification Version 1.1", created by Wi-Fi Alliance. The WFD scheme is, e.g., a wireless communication scheme for executing a wireless communication in accordance with IEEE (abbreviation of The Institute of Electrical and Electronics Engineers, Inc.) standard 802.11 and standards conforming thereto (e.g., 802.11a, 11b, 11g, 11n, etc.).

Below, a device capable of executing a WFD communication in accordance with the WFD scheme, such as the MFP 10, the portable terminal 50, etc. is called a "WFD-compatible device". In the above standard of WFD, the following three states are defined as the states of a WFD-compatible device: Group Owner state (called "G/O state" below), client state (called "CL state" below), and device state. The WFD-compatible device is capable of selectively operating in one state among the three states.

When a pair of WFD-compatible devices in the device state is to newly form a wireless network, the pair of WFD-compatible devices usually executes a wireless communication called G/O negotiation. In the G/O negotiation, it is determined that one of the pair of WFD-compatible devices will assume the G/O state (i.e., become a G/O device), and that the other of the pair of WFD-compatible devices will assume the CL state (i.e., become a CL device). Then the pair of WFD-compatible devices establishes a connection and forms the wireless network.

That is, the WFD NW can be rephrased as being a wireless network that is formed according to a procedure (e.g., G/O negotiation) of the WFD scheme. Only one G/O device and one CL device belong to the WFD NW at a stage of newly forming the WFD NW using the G/O negotiation. However, the G/O device can establish a connection with another device, and cause the other device to newly participate in the WFD NW as a CL device. In this case, a state is formed in which two or more CL devices belong to the WFD. That is, one G/O device and one or more CL devices can be present in the WFD NW. The G/O device manages the one or more CL devices. Specifically, the G/O device registers the MAC address of each of the one or more CL devices in a management list in a memory of the G/O device. Further, when the CL device is released from the WFD NW, the G/O device deletes the MAC address of the CL device from the management list. Moreover, when the number of CL devices becomes zero (i.e., when the number of MAC addresses registered in the management list becomes zero), the G/O device normally shifts from the G/O state to the device state, extinguishing the WFD NW.

The upper limit of the number of CL devices the G/O device can manage (i.e., the upper limit of the number of the MAC addresses of CL devices that can be registered in the management list) is predetermined by the G/O device. In the present embodiment, the upper limit of the number of CL devices the G/O device can manage is an integer of two or more. However, in a variant, the upper limit of the number of CL devices the G/O device can manage may be one. That is, the upper limit of the number of CL devices the G/O device can manage may be an integer of one or more.

The G/O device is capable of executing a wireless communication of target data, not via another device, with a CL device registered in the management list. The target data is data that includes network layer information of an OSI reference model, and information of a layer higher than a network layer (e.g., application layer), e.g., print data, scan data, etc. Further, the G/O device is capable of relaying a wireless communication of the target data between a plurality of CL devices. In other words, a pair of CL devices is capable of executing a wireless communication of the target data via the G/O device.

As described above, in the WFD NW, the wireless communication of the target data can be executed between a WFD-compatible device which is the source of the target data and a WFD-compatible device which is the destination of the target data without passing through an AP (e.g., the AP 90) which is configured separately from the WFD-compatible devices. That is, the WFD communication, WFD scheme, and WFD NW can respectively be called a wireless communication not via an AP, a wireless communication scheme not utilizing an AP, and a wireless NW not including an AP.

Moreover, differences between a WFD G/O device and an AP (e.g., the AP 90) are as follows. That is, in a case of being separated from the WFD NW to which that device is belonging, and newly belonging to another WFD NW, the WFD G/O device can operate in a state different from the G/O state (i.e., CL state). By contrast, the AP can only execute the same operation as the G/O state of the WFD (e.g., relay wireless communication), and cannot execute the same operation as the CL state of the WFD.

The G/O device cannot execute a wireless communication for the target data with a WFD-compatible device that is in the device state (i.e., a device-state device), but can execute a wireless communication of connection data of the WFD scheme with the device-state device. That is, by executing a wireless communication with the device-state device of connection data of the WFD scheme, the G/O device can establish a connection with the device-state device and cause the device-state device to participate in the WFD NW. In other words, by executing a wireless communication of the connection data of the WFD scheme with the G/O device, the device-state device can establish a connection with the G/O apparatus and can participate in the WFD NW. In this case, the device-state device shifts from the device state to the CL state. The connection data of the WFD scheme is data including information of a layer lower than the network layer of the OSI reference model (e.g., physical layer, data link layer) (i.e., is data not including network layer information), e.g., including a Probe Request signal, Probe Response signal, Provision Discovery Request signal, Provision Discovery Response signal, Association Request signal, Association Response signal, Authentication Request signal, Authentication Response signal, 4-Way Handshake signal, etc.

Further, by executing a wireless communication with the normal Wi-Fi device of connection data of the normal Wi-Fi scheme, the G/O device can establish a connection with the normal Wi-Fi device and cause the normal Wi-Fi device to participate in the WFD NW. The normal Wi-Fi device is a device which cannot belong to a wireless network in accordance with the WFD scheme (i.e., cannot execute a G/O negotiation), but can belong to a wireless network in accordance with the normal Wi-Fi scheme. The normal Wi-Fi device is also called a "legacy device". Except for the point that the connection data of the normal Wi-Fi scheme does not include the Provision Discovery Request signal and the Provision Discovery Response signal, the connection data of the normal Wi-Fi scheme is the same as the connection data of the WFD scheme. In case of establishing a connection with a normal Wi-Fi device, the G/O device describes a MAC address of the normal Wi-Fi device in the management list. Thereby, the normal Wi-Fi device can participate in the WFD NW. The normal Wi-Fi device is not capable of selectively operating in any state of the three states (i.e., G/O state, CL state, device state), but operates in the same state as a CL device while belonging to the WFD NW.

As described above, the G/O device can establish a connection with a WFD-compatible device (i.e., a device-state device) or a normal Wi-Fi device, and cause the WFD-compatible device or normal Wi-Fi device to newly participate in the WFD NW. However, unlike the G/O device, the CL device cannot establish a connection with a WFD-compatible device or a normal Wi-Fi device and cause the WFD-compatible device or normal Wi-Fi device to newly participate in the WFD NW.

Figure 8:
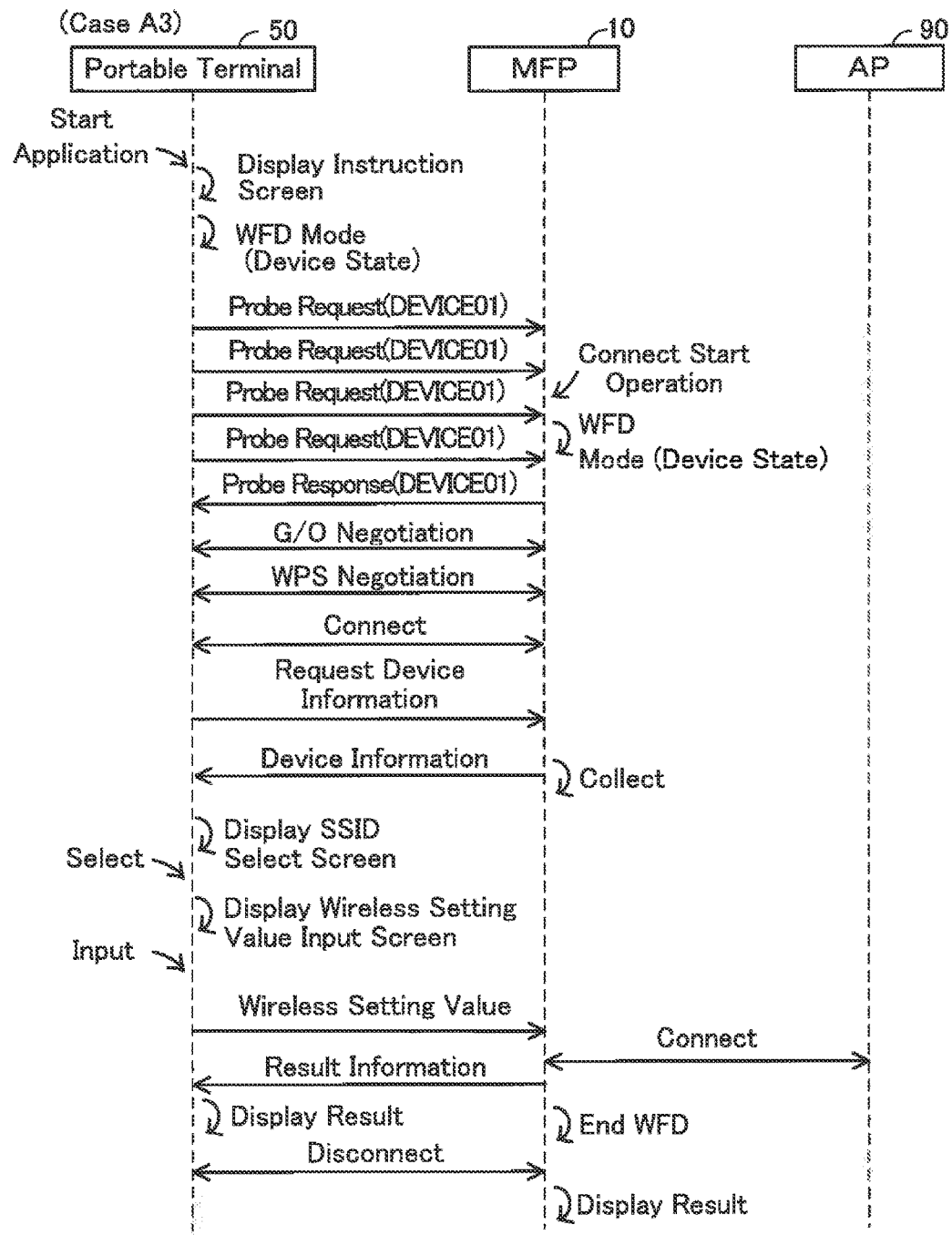
FIG. 8 shows a sequence chart of communication of case A3 of a third embodiment.

(Case A3; FIG. 8)

Next, a specific case A3 realized by the present embodiment will be described with reference to FIG. 8. In case A3, as in case A1 (FIG. 5), the MFP 10 receives a wireless setting value from the portable terminal 50, and establishes a normal Wi-Fi connection with the AP 90 by utilizing the received wireless setting value.

In case A3, also, the user first operates the operation unit of the portable terminal 50 to execute the start application operation for starting the connection application. When the start application operation is executed, the portable terminal 50 starts the connection application. When the connection application has been started, the portable terminal 50 operates in WFD mode. At the time when the portable terminal 50 has started operation in WFD mode, the state of the portable terminal 50 is device state. The portable terminal 50 causes the display unit of the portable terminal 50 to display the instruction screen which includes a message for prompting the user to execute the predetermined connect start operation in the operation unit 12 of the MFP 10. The portable terminal 50 wirelessly sends the Probe Request signal which includes a device name of the MFP 10 (the value "DEVICE01" determined in advance) which is being stored in the portable terminal 50. In the example of FIG. 8, the portable terminal 50 repeatedly sends the Probe Request signal each predetermined period. Moreover, below, inclusion of "DEVICE01" in the Probe Request signal, or in the Probe Response signal may be represented as "Probe Request signal (DEVICE01)" or "Probe Response signal (DEVICE01)".

On the other hand, the user executes the predetermined connect start operation in the operation unit 12 of the MFP 10. When the predetermined connect start operation is executed, the MFP 10 operates in WFD mode. At the time when the MFP 10 has started operation in WFD mode, the state of the MFP 10 is the device state. Upon starting operation in WFD mode, the MFP 10 receives the Probe Request signal (DEVICE01) sent by the portable terminal 50. Upon receiving the Probe Request signal (DEVICE01), the MFP 10 sends, to the portable terminal 50, the Probe Response signal (DEVICE01) which includes the device name of the MFP 10 (i.e., "DEVICE01").

When the portable terminal 50 receives the Probe Response signal (DEVICE01), a G/O negotiation is executed between the MFP 10 which is in the device state and the portable terminal 50 which is in the device state. Although not shown, in the present case A3, the MFP 10 shifts to G/O state, and the portable terminal 50 shifts to CL state as a result of the G/O negotiation. Next, WPS negotiation is executed between the MFP 10 which is in G/O state and the portable terminal 50 which is in CL state. As a result of the WPS negotiation, a WFD connection is established between the MFP 10 which is in G/O state and the portable terminal 50 which is in client state. That is, a WFD NW is constructed by the MFP 10 and the portable terminal 50.

Next, the portable terminal 50 sends a device information request to the MFP 10 by using the WFD NW. Upon receiving the device information request, the MFP 10 collects the device information from the respective one or more APs (the AP 90, etc.) which exist around the MFP 10, and sends the collected one or more device information to the portable terminal 50 by using the WFD NW.

In the present case A3, also, upon receiving the one or more device information, the portable terminal 50 causes the display unit to display the SSID select screen (see FIG. 3). The user operates the operation unit of the portable terminal 50 to select the SSID of the AP 90 from among the one or more SSIDs displayed in the SSID select screen. Upon selection of the SSID of the AP 90, the portable terminal 50 causes the display unit to display the wireless setting value input screen (see FIG. 4). In the present case A3, also, the user operates the operation unit of the portable terminal 50 to input the predetermined password of the AP 90 into the password input field 114, and presses the connection button 116.

When the connection button 116 is pressed, the portable terminal 50 sends the wireless setting value to the MFP 10 by using the WFD NW. In the present case A3, upon receiving the wireless setting value, the MFP 10 establishes the normal Wi-Fi connection with the AP 90 by using the received wireless setting value. Thus, the normal Wi-Fi NW including the MFP 10 and the AP 90 is constructed.

Next, using the WFD NW, the MFP 10 sends result information including success information indicating that connection succeeded to the portable terminal 50. Upon receiving the result information, the portable terminal 50 causes the display unit to display a connection result indicating that the normal Wi-Fi connection has been established.

Upon sending the result information, the MFP 10 ends the WFD mode. Thus, the WFD connection between the MFP 10 and the portable terminal 50 is disconnected, and the WFD NW disappears. Next, the MFP 10 causes the display unit 14 to display the connection result indicating that the normal Wi-Fi connection has been established.

(Corresponding Relationships)

The WFD mode of the MFP 10 is an example of the "second operation mode". The Probe Request signal (DEVICE01) of case A3 of FIG. 8 is an example of the "second signal".

Fourth Embodiment

The description for the fourth embodiment will be given focusing on points different from the first embodiment. In the first embodiment, when the predetermined connect start operation is executed in the operation unit 12 of the MFP 10, the MFP 10 initially operates in Soft AP mode (S10 of FIG. 2). In case of not receiving a Probe Request signal from the portable terminal before the second period has elapsed since starting the Soft AP (NO in S12), the MFP 10 ends the Soft AP mode (S30), and shifts to a mode in which reception of a Probe Response signal from the AP 90 is monitored (WPS mode) (S32, S34). Instead of this, in the present embodiment, when the predetermined connect start operation is executed in the operation unit 12 of the MFP 10, the MFP 10 initially operates in a mode in which reception of the Probe Response signal from the AP 90 is monitored (WPS mode) (S50, S52 of FIG. 9). In the present embodiment, in case of not receiving the Probe Response signal (WPS mode) from the AP before the first period has elapsed since the broadcasting of the Probe Request signal (NO in S52), the MFP 10 shifts to Soft AP mode (S60).

(Wireless Connection Process of CPU 30 of MFP 10; FIG. 9)

Next, contents of a wireless connection process executed by the CPU 30 of the MFP 10 will be described with reference to FIG. 9. When the predetermined connect start operation is executed in the operation unit 12 of the MFP 10, the CPU 30 acquires an instruction given by that operation. In this case, in S50, the CPU 30 wirelessly broadcasts a Probe Request signal. The contents of the process of S50 is the same as the process S32 of FIG. 2.

Next, in S52, the CPU 30 monitors whether the Probe Response signal (WPS mode) is received from the AP 90 which is operating in WPS mode before the predetermined first period has elapsed since the broadcasting of the Probe Request signal in S50. The process of S52 is the same as the process S34 of FIG. 2. In case of YES in S52, processing proceeds to S54. On the other hand, in case of NO in S52, processing proceeds to S60. The contents of the processes S54, S56 are the same as the contents of the processes S36, S38 of FIG. 2. Upon completion of the process of S56, processing proceeds to S58.

In S60, the CPU 30 starts the Soft AP and sets the operation mode of the MFP 10 to the Soft AP mode. The contents of the process of S60 are the same as S10 of FIG. 2. Next, in S62, the CPU 30 monitors whether a Probe Request signal is received from the portable terminal 50 before the predetermined second period has elapsed since starting the Soft AP in S60. The process of S62 is the same as S12 of FIG. 2. In case of YES in S62, processing proceeds to S64. In case of NO in S62, processing returns to S50. Although not shown, in this case, the CPU 30 ends the Soft AP (i.e., ends the application started in S60).

In S64, the CPU 30 monitors establishment of a Soft AP connection with the portable terminal. The process of S64 is the same as the process of S14 of FIG. 2. In case of YES in S64, processing proceeds to S66. In case of NO in S64, processing returns to S50. Although not shown, in this case also, the CPU 30 ends the Soft AP (i.e., ends the application started in S60).

The contents of the processes S66, S68, S70, S72, S74, S76 are the same as the contents of the processes S16, S18, S20, S22, S24, S26 of FIG. 2. Upon completion of the process of S76, processing proceeds to S58.

The contents of the process of S58 are the same as the contents of the process of S28 of FIG. 2. Upon completion of the process of S58, the CPU 30 ends the wireless connection process of FIG. 9.

(Case C; FIG. 10)

Next, a specific case C realized by the present embodiment will be described with reference to FIG. 10. In case C, the user does not execute a specific connect start operation in the AP 90. After having started the Soft AP, the MFP 10 receives the wireless setting value from the portable terminal 50, and establishes a normal Wi-Fi connection with the AP 90 by utilizing the received wireless setting value.

In case C, also, the user first operates the operation unit of the portable terminal 50 to execute the start application operation for starting the connection application. When the start application operation is executed, the portable terminal 50 starts the connection application. When the connection application has been started, the portable terminal 50 causes the display unit of the portable terminal 50 to display the instruction screen which includes a message for prompting the user to execute the predetermined connect start operation in the operation unit 12 of the MFP 10. Thereupon, the portable terminal 50 wirelessly repeatedly sends a Probe Request signal (SSID-X) which includes the SSID (the value "SSID-X" determined in advance) of the MFP 10 which is operating in the Soft AP mode.

On the other hand, the user executes the predetermined connect start operation in the operation unit 12 of the MFP 10. The MFP 10 wirelessly broadcasts the Probe Request signal (S50 of FIG. 9). In the present case C, the user does not execute the specific wireless start operation in the AP 90. Consequently, the AP 90 is not operating in the WPS mode. Consequently, the MFP 10 does not receive the Probe Response (WPS mode) before the first period has elapsed since the broadcasting of the Probe Request signal in S50 (NO in S52 of FIG. 9). The MFP 10 then starts the Soft AP, and sets the operation mode of the MFP 10 to the Soft AP mode (S60). Thus, the MFP 10 operates as the AP to which the SSID "SSID-X" has been assigned. Upon starting operation in the Soft AP mode, the MFP 10 receives the Probe Request signal (SSID-X) sent by the portable terminal 50 (YES in S62). Upon receiving the Probe Request signal (SSID-X), the MFP 10 sends a Probe Response signal (SSID-X) which includes the SSID of the MFP 10 (i.e., "SSID-X") to the portable terminal 50.

Next, the MFP 10 establishes a Soft AP connection with the portable terminal 50 (YES in S64). Thus, a Soft AP NW including the MFP 10 and the portable terminal 50 is constructed.

The processes after establishment of the Soft AP connection between the portable terminal 50 and the MFP 10 are the same as the processes after establishment of the Soft AP connection between the portable terminal 50 and the MFP 10 in case A1 of the first embodiment, and therefore a detailed description is omitted.

The MFP 10 of the present embodiment also basically exhibits the same operations and effects as the MFP 10 of the first embodiment. That is, in the present embodiment, also, in case of wanting to connect the MFP 10 to the AP 90, the user can start the connection application of the portable terminal 50, as shown in case C of FIG. 10, and can execute the specific connect start operation in the AP 90 (see case B of FIG. 6). Therefore, the MFP 10 judges whether the wireless setting value for establishing a normal Wi-Fi connection with the AP 90 is to be received from the AP 90 (i.e., whether the situation is the user executing the specific connect start operation in the AP 90), or is to be received from the portable terminal 50 (i.e., whether the situation is the user starting the connection application of the portable terminal 50) (S52, S64 of FIG. 9). Thus, the MFP 10 can appropriately receive the wireless setting value from the device corresponding to the determination result (i.e., the AP 90 or the portable terminal 50). Therefore, the MFP 10 can appropriately establish a normal Wi-Fi connection with the AP 90 by using the received wireless setting value (S56, S72 of FIG. 9).

(Corresponding Relationships)

Acquiring an instruction given by the predetermined connect start operation executed in the operation unit 12 of the MFP 10 is an example of "acquiring". The processes of S52, S62 of FIG. 9 are an example of "judging". The processes of S54, S56 are an example of "receiving the specific wireless setting value from the specific access point" and "establishing the wireless connection with the specific access point by using the specific wireless setting value received from the specific access point". The process of S72 is an example of "establishing the wireless connection with the specific access point by using the specific wireless setting value received from the terminal device". The process of S74 is an example of "sending success information" and "sending failure information". In the process of S68, the process of collecting the device information of the APs which exist around the MFP 10 is an example of a process in which "receiving the specific wireless setting value from the terminal device" is executed. In the process of S68, the process of sending the device information of the APs which exist around the MFP 10 to the portable terminal 50 is an example of a process in which "sending one or more the partial setting values" is executed.

Specific examples of the present invention are described above in detail, but these examples are merely illustrative and place no limitation on the scope of the patent claims. The technology described in the patent claims also encompasses various changes and modifications to the specific examples described above. Modifications to the above embodiment are listed below.

(Variant 1)

The "communication device" is not restricted to a multi-function peripheral capable of executing a print function and a scan function (i.e., the MFP 10), but may be a printer capable of executing only the print function from among the print function and scan function, or may be a scanner capable of executing only the scan function from among the print function and scan function. Further, the "communication device" may be an apparatus (e.g., a PC, server, portable terminal (mobile phone, Smart Phone, PDA, etc.)) which executes a function different from the print function and scan function (e.g., an image display function, a data calculating function).

(Variant 2)

In the second embodiment, the CPU 30 of the MFP 10 may be configured to send result information to the portable terminal 50 indicating whether a normal Wi-Fi connection has been established with the AP 90. In this case, the CPU 30 of the MFP 10 may re-establish the ad-hoc connection with the portable terminal 50, and then send the result information to the portable terminal 50 by using the re-established ad-hoc NW. This process is also an example of "sending success information" and "sending failure information".

(Variant 3)

The processes of S16, S18 of FIG. 2, and the processes of S66, S68 of FIG. 9 may be omitted. In this case, the user may operate the operation unit of the portable terminal 50 to input the wireless setting value to the portable terminal 50. The MFP 10 may receive, from the portable terminal 50, the wireless setting value which was input to the portable terminal 50. The wireless setting value received in this manner is also an example of the "specific wireless setting value".

(Variant 4)

In the above embodiments, the processes of FIG. 2 and FIG. 9 are realized by software (i.e., programs). However, at least one of the processes of FIG. 2 and FIG. 9 may be realized by hardware such as a logic circuit, etc.

What is claimed is:

1. A communication device comprising:
a processor; and
a memory storing computer-readable instructions therein that, when executed by the processor, cause the communication device to perform:
acquiring a specific instruction for establishing a wireless connection with a specific access point in accordance with an automatic wireless setting mode;
judging whether a first signal is received or a second signal is received in a case where the specific instruction is acquired, the first signal being a Probe Response signal sent from the specific access point in response to a Probe Request signal sent from the communication device to the specific access point, the second signal being a Probe Request signal sent from a terminal device different from the specific access point, the Probe Request signal sent from the terminal device including identification information of the communication device;
receiving, from the specific access point, a specific wireless setting value which is used in a communication between the communication device and the specific access point, in a case where it is judged that the first signal is received, the communication being for establishing the wireless connection with the specific access point;
receiving, from the terminal device different from the specific access point, the specific wireless setting value in a case where it is judged that the second signal is received; and
establishing the wireless connection with the specific access point by using the received specific wireless setting value.

2. The communication device as in claim 1, wherein the computer-readable instructions, when executed by the processor, cause the communication device to further perform:
setting an operation mode of the communication device to one of a plurality of operation modes in the case where the specific instruction is acquired, the plurality of operation modes including a first operation mode for monitoring a receipt of the first signal from the specific access point and a second operation mode for monitoring a receipt of the second signal from the terminal device,
wherein the judging includes:
judging that the specific wireless setting value is to be received from the specific access point, in a case where the first signal is received from the specific access point before a first period is elapsed since when the operation mode of the communication device was set to the first operation mode; and
judging that the specific wireless setting value is to be received from the terminal device, in a case where the second signal is received from the terminal device before a second period is elapsed since when the operation mode of the communication device was set to the second operation mode.

3. The communication device as in claim 2, wherein the setting includes:
changing the operation mode of the communication device from the first operation mode to the second operation mode, in a case where the first signal is not received from the specific access point before the first period is elapsed since when the operation mode of the communication device was set to the first operation mode; and
changing the operation mode of the communication device from the second operation mode to the first operation mode, in a case where the second signal is not received from the terminal device before the second period is elapsed since when the operation mode of the communication device was set to the second operation mode.

4. The communication device as in claim 2, wherein the setting includes:
initially setting the operation mode of the communication device to the second operation mode, in the case where the specific instruction is acquired; and
changing the operation mode of the communication device from the second operation mode to the first operation mode, in a case where the second signal is not received from the terminal device before the second period is elapsed since when the operation mode of the communication device was set to the second operation mode.

5. The communication device as in claim 2, wherein the setting includes:
initially setting the operation mode of the communication device to the first operation mode, in the case where the specific instruction is acquired; and
changing the operation mode of the communication device from the first operation mode to the second operation mode, in a case where the first signal is not received from the specific access point before the first period is elapsed since when the operation mode of the communication device was set to the first operation mode.

6. The communication device as in claim 2, wherein the setting includes setting the operation mode of the communication device to the second operation mode by causing the communication device to function as a parent station of a wireless network.

7. The communication device as in claim 2, wherein the judging includes:
  judging whether the first signal is received from the specific access point by sending a specific request signal to the specific access point, in a case where the operation mode of the communication device is set to the first operation mode; and
  judging whether the second signal is received from the terminal device without sending the specific request signal to the terminal device, in a case where the operation mode of the communication device is set to the second operation mode.

8. The communication device as in claim 1, wherein the computer-readable instructions, when executed by the processor, cause the communication device to further perform:
  sending success information indicating a successful establishment of the wireless connection to the terminal device, in the case where it is judged that the specific wireless setting value is to be received from the terminal device, and in which case where the wireless connection is established with the specific access point; and
  sending failure information indicating an unsuccessful establishment of the wireless connection to the terminal device, in the case where it is judged that the specific wireless setting value is to be received from the terminal device, and in which case where the wireless connection is not established with the specific access point.

9. The communication device as in claim 1, wherein the computer-readable instructions, when executed by the processor, cause the communication device to further perform:
  receiving, from each of one or more access points which exist around the communication device, a partial setting value that is a part of a wireless setting value currently set to the access point, in the case where it is judged that the specific wireless setting value is to be received from the terminal device; and
  sending one or more the partial setting values of the one or more access points to the terminal device.

10. A non-transitory computer-readable medium storing computer-readable instructions for a communication device, wherein
  the computer-readable instructions, when executed by a controller mounted on the communication device, cause the communication device to perform:
    acquiring a specific instruction for establishing a wireless connection with a specific access point in accordance with an automatic wireless setting mode;
    judging whether a first signal is received or a second signal is received in a case where the specific instruction is acquired, the first signal being a Probe Response signal sent from the specific access point in response to a Probe Request signal sent from the communication device to the specific access point, the second signal being a Probe Request signal sent from a terminal device different from the specific access point, the Probe Request signal sent from the terminal device including identification information of the communication device;
    receiving, from the specific access point, a specific wireless setting value which is used in a communication between the communication device and the specific access point, in a case where it is judged that the first signal is received, the communication being for establishing the wireless connection with the specific access point;
    receiving, from the terminal device different from the specific access point, the specific wireless setting value in a case where it is judged that the second signal is received; and
    establishing the wireless connection with the specific access point by using the received specific wireless setting value.

* * * * *